April 27, 1926.
J. M. PALMER
TOOL HOLDER FOR LATHES
Filed Nov. 10, 1921
1,582,077
2 Sheets-Sheet 1
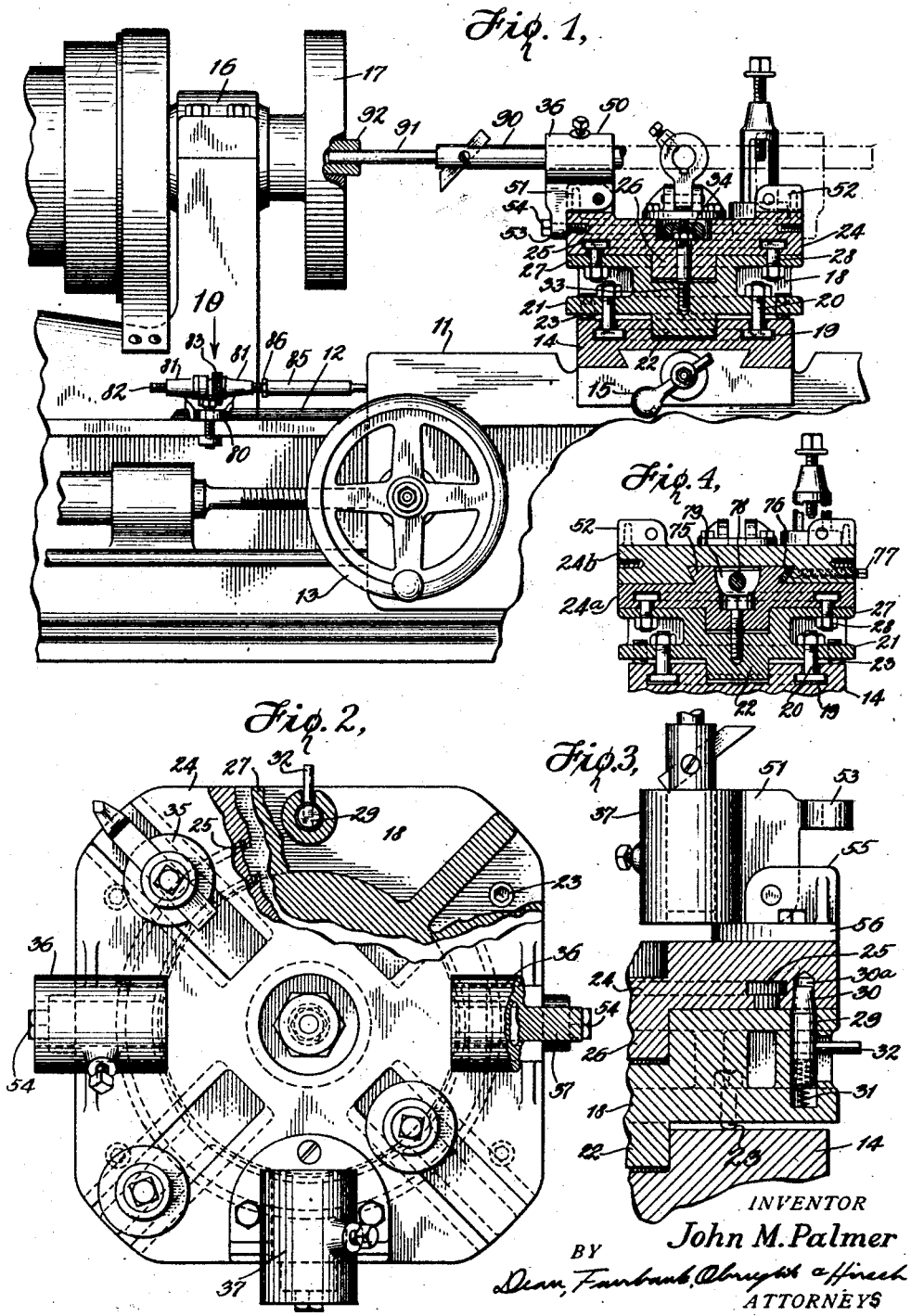
INVENTOR
John M. Palmer
BY
ATTORNEYS

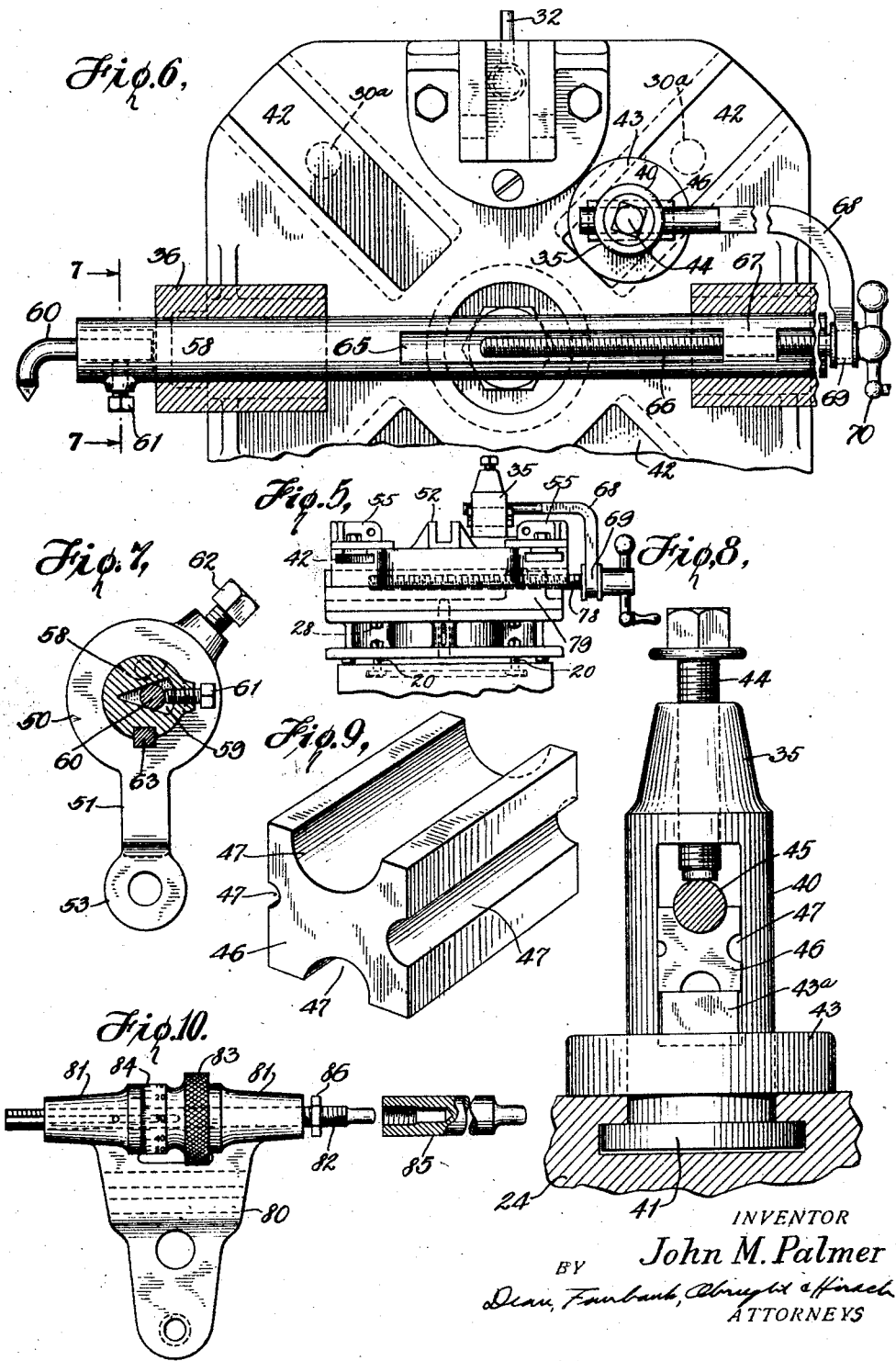

Patented Apr. 27, 1926.

1,582,077

UNITED STATES PATENT OFFICE.

JOHN M. PALMER, OF NEW YORK, N. Y.

TOOL HOLDER FOR LATHES.

Application filed November 10, 1921. Serial No. 514,147.

*To all whom it may concern:*

Be it known that I, JOHN M. PALMER, a citizen of the United States, and resident of New York, in the county of New York and State of New York, have invented certain new and useful Improvements in Tool Holders for Lathes, of which the following is a specification.

This invention relates to tool holders for lathes, and has for its main object the provision of means whereby a plurality of tools may be supported and brought into and out of operative position and at the same time any one of the tools may be given all of the feeding or adjusting movement possible in either an ordinary lathe or a turret lathe. In my improved construction I provide a tool holder table adapted to carry a plurality of tools or tool holders, and capable of all or most of the following feeding or adjusting movements: a movement lengthwise of the work with the carriage; a movement transversely of the work with a slide on the carriage; a rotary movement about a vertical axis for purposes of adustment; an independent rotary movement about the same axis for bringing different tools into operative position; and a tilting movement for varying the plane of rotation in respect to the axis of the work.

As a further feature I provide means for properly centering in the tool holders tools of different diameters. As a further important feature I provide means whereby the tool holders may be quickly and easily moved to any operative position; and as a further important feature I provide a simple and efficient means for feeding the tool holder table in respect to its rotatable support.

Other important features and advantages of my invention will be apparent from a consideration of a preferred embodiment of the invention, or will be pointed out in connection with the following description thereof.

In the accompanyng drawings to which reference is to be had:—

Fig. 1 shows a portion of a lathe equipped with one form which my invention may assume, certain of the parts being shown in section.

Fig. 2 is a top plan view of the tool holder table and connected parts shown in Fig. 1, portions being broken away;

Fig. 3 is a sectional detail,

Fig. 4 is a section similar to a portion of Fig. 1, but showing a modified and preferred form, Fig. 5 is a side elevation of the form shown in Fig. 4, and viewed in a direction substantially at right angles to the plane of Fig. 4, Fig. 6 is a plan view somewhat similar to Fig. 2, but showing one form of my improved tool feeding means, Fig. 7 is a transverse section on the line 7—7 of Fig. 6, Fig. 8 is an enlarged view of another form of improved tool holder;

Fig. 9 is a perspective view of the tool supporting block shown in Fig. 8, and

Fig. 10 is a view of the carriage stop partly in section and looking in the direction of the arrow 10 of Fig. 1.

I have illustrated my invention as applied to a common form of lathe having a carriage 11 mounted for movement along the bed 12 and by any suitable mechanism such for instance as a hand wheel 13. The carriage carries a slide 14 which is mounted for movement in a direction at right angles to the direction of movement of the carriage and by any suitable operating means, such for instance as a small hand wheel, crank or lever 15. These parts, so far as thus described, may be of any common or well known form. The lathe is provided with a head stock 16 for supporting the means which carries and rotates the work. The work support may be a chuck or any other suitable means 17 to which the work may be clamped, or which serves to support and rotate one end of the work if the opposite end be supported by a tail stock.

In my improved construction the slide 14 is provided with a table support 18 normally rigidly clamped to the slide but adjustable about a vertical axis and tiltable in respect to the slide. As shown, the slide is provided with an annular undercut groove 19 receiving the heads of bolts 20 carried by a lower flange 21 of the table support 18. The table support also has a central depending projection or boss 22 entering a similar shaped cavity in the upper side of the slide. The projection or boss serves as a pivot about which the table support 18 may be rotated. The table support and the slide are normally rigidly connected with the nuts on the bolts 20 effectively tightened. By loosening these nuts the table support may be rotated to any desired extent, and may then be again rigidly clamped in position.

For varying the plane of the table support 18 as for instance to bring the table support to an exact horizontal plane in spite of defects or worn condition of the carriage or slide, I provide the flange 21 with a plurality of adjustable stops 23 for engagement with the upper surface of the slide 14. These adjustable stops or leveling screws are in the form of screw bolts and are spaced about the vertical axis of the table support. By turning these screw bolts at either side of the axis and to the desired extent, the table support may be brought to a horizontal plane or to any desired angle in respect to the horizontal. It will of course be obvious that these adjustable stops are operated and brought to the desired adjustment before the clamping bolts 20 are tightened, and it will also be understood that there is sufficient free play in the apertures and grooves which receive the bolts and in the recess which receives the projection 22 so as to permit of the slight tilting of the table support 18 and the effective clamping of it when properly tilted.

In the form shown in Fig. 1, the table support 18 serves to carry a table 24 which has an undercut groove 25 in its under surface similar to the groove 19 in the upper surface of the slide. The table has a depending projection 26 entering a socket in the upper surface of the table support 18, and serving as a pivot or journal with a vertical axis about which the table may rotate. The table support 18 has an upper flange 27 somewhat similar to the lower flange 21 and carrying bolts 28, the heads of which are in the groove 25. Although these bolts may be tightened to lock the table and table support rigid in respect to each other, the bolts are ordinarily left slightly loose, so that the table may be freely rotated to bring the different tools carried thereby into or out of operative position. For normally locking the table and table support against rotation there is provided a suitable locking bar or latch, such for instance as that shown in Figs. 2 and 3. This bar 29 is mounted in the table support for vertical movement. It has a conical end 30 movable into or out of a corresponding recess 30ᵃ in the under surface of the table, and is normally pressed up by a spring 31. It may be lowered at will by means of a handle 32 to permit free rotation of the table. The table has a series of apertures 30ᵃ for receiving the end of the bar 29, the number of these apertures and the position of them corresponding to the number and position of the tools on the tool carrying table 24. The table is further centered and held in place on the table support by a central pivot bolt 33 threaded into the table support and having the table rotatably mounted thereon. This pivot bolt may have a pair of lock nuts 34 at the upper end and countersunk below the upper surface of the table.

The table has a plurality of tool or bar holders which are so designed that various different tools may be mounted on the table and any one brought into operative position upon the proper rotation of the table. As shown, there are four tool holders 35 radially movable on the table along equally spaced radii, a pair of pivotally mounted tool or bar holders 36 at diametrically opposite points on the table, and a pair of pivotally and detachably mounted tool or bar holders 37 at diametrically opposite points and spaced 90° from the tool holders 36. The tool holders 35 are preferably in the form shown in Figs. 8 and 9, and include a yoke member 40 presenting a head 41 movable along a corresponding radial slot 42. The yoke member is encircled by a collar 43 adapted to rest on the upper surface of the table and in a central curved depression in the upper surface of the collar is a rest 43ᵃ which may be adjusted to vary the plane of its upper support. A screw bolt 44 is mounted in the upper end of the yoke and adapted to engage with the tool 45 and rigidly hold the latter in the tool holder in the proper position in respect to the center of the work, and at the same time to hold the tool holder stationary on the table. As an important feature of my invention the tool holder is provided with a tool supporting block 46 which is rectangular and presents sides of equal width so that the block may be placed in the holder with any one of its four sides facing upwardly. These four sides are provided with recesses or grooves 47, the grooves in the four different sides being of different width and depth. They are preferably substantially semi-cylindrical in form to receive cylindrical tools. The radius of curvature of the several grooves may be the same as that of four standard sizes of tools, so that upon properly positioning the block in accordance with the size of tool to be used, and tightening the screw bolt 44, the tool may be not only rigidly held in position, but can be accurately centered against any lateral movement. It will of course be evident that for using a tool of an intermediate size, or of a size larger than the largest groove 47, the tool supporting block may be placed in position with the groove uppermost which is the next smaller than the diameter of the tool. Thus the tool will bear on the two opposite edges of the groove, even though it does not extend to the bottom of the groove, and the block will work equally effectively in rigidly holding and centering the tool. The tool holders 36 are constructed substantially as shown in Fig. 7, and have a tubular body portion 50 normally extending with its axis in a substantially horizontal direction. This tubular body portion has a depending flange 51 pivoted to an upwardly extending flange 52 cast integral with the table. The flange 51 also has a projecting lug portion 53 adapted to engage with the outer surface of the table and receive a screw bolt 54, as shown particularly in Fig. 1. When the screw bolt is tightened the tool holder 36 is rigidly secured in position. The tool holders 37 are substantially the same as the tool holders 36, but are each pivoted to a flange 55 which is carried by a bracket 56 detachably bolted to the upper surface of the table. Thus the tool holders 37 may be swung out of position, or may be entirely removed while the tool holders 36 can not be removed except upon the removal of the pivot bolt.

The tool holders 36 and 37 have a central passage normally materially larger than the ordinary tool, and are adapted to receive a tool holder 58 having a recess 59 extending into the end thereof and of substantially triangular form. The opposite sides of the recess are at equal angles to a diameter and upon opposite sides thereof, so that a tool 60 may be inserted in the recess and forced between these two converging sides of the recess 59 by means of a set screw 61. Thus tools of various different sizes may be inserted in the tool carrier and they will be locked at the proper elevation, irrespective of variations in the diameter of the tool. The tool carrier may be secured in the tool holder by any suitable means, such as a set screw 62. The tool carrier is prevented from rotating in the tool holder in any suitable manner, as for instance by means of a key 63.

The tool holders 36 are mounted in axial alignment so that the tool carrier 58 may be of such length as to be supported by both of these tool holders. The tool holders may serve as guides for the endwise feeding of the tool. As shown particularly in Fig. 6, the tool carrier 58 has a groove 65 in one side thereof within which is mounted a feed screw 66 threaded in a transverse portion 67 of the tool carrier. By holding one end of the feed screw against longitudinal movement the rotation of the feed screw will cause the tool to move endwise. As a simple and effective way of holding a feed screw against endwise movement, I preferably employ a bar 68 having one end in the form of a yoke 69 engaging between flanges on the feed screw and with the other end rigidly clamped in position in one of the tool holders 35. The feed screw may have a suitable hand wheel or operating handle 70 at the rear end thereof. By angularly adjusting the table support 18 in respect to the slide 14, it will be seen that the tool carrier 58 may be moved back and forth in a direction parallel to the axis of rotation of the work, or at any desired angle in respect to such axis. At the same time if the feed screw 66 remains in any desired adjustment, the tool 60 may be caused to move parallel to the axis of the work by a bodily movement of the carriage 11 toward and from the work. Thus by moving the tool either by the carriage or by the feed screw 66, it may be caused to move either parallel to or at an angle to the axis of the work, and cut a cylindrical or tapered surface.

Instead of feeding the tool carrier in respect to the table as above described, I preferably mount the table so that it may be fed in a substantially horizontal direction and in respect to the table support. I have illustrated such a preferred embodiment of my invention in Figs. 4 and 5.

In the form here shown the table is formed of two slidably connected sections 24$^a$ and 24$^b$. The lower portion or surface of the section 24$^a$ may be substantially the same as the lower portion of the table 24 shown in Fig. 1, and the upper portion of the section 24$^b$ may be substantially the same as the upper portion of the table 24. The two portions instead of being integral, as in Fig. 1 are so connected that the upper section 24$^b$ may be adjusted, fed or slid in a substantially horizontal plane in respect to the lower section. As shown, the lower section 24$^a$ has a dove tail flange 75 extending transversely thereof and fitting into a corresponding groove in the under surface of the upper section 24$^b$. Accurate fit may be secured and lost motion prevented by means of a liner strip 76 adjusted by one or more adjusting screws 77. The dove tail flange 75 has a longitudinal groove in its upper surface and within this is mounted means for feeding or adjusting the upper section 24$^b$ in respect to the lower section. One such feeding means is illustrated in Fig. 5. Within the groove is mounted a feed screw 78 threaded in a lug 79 so that upon the rotation of the feed screw it moves endwise in the groove. Means are provided whereby the tool carrying part of the table is caused to move endwise with the feed screw. As shown in Fig. 5, I may employ the bar 68 or a similar one for this purpose. The bar may have one end adjustably fastened in a tool holder 35, and the other end presents a yoke or fork 69 for engagement between flanges on the feed screw. In fact the feed screw and bar may be constructed and operated in the same way as the corresponding part shown in Fig. 6, except in one case the feed screw moved endwise and causes the movement of the tool holder carrying part of the table, while in the other the feed screw is held against longitudinal movement and moves the tool carrier. By means of this sliding connection between the two parts of the table the axis of the tool may be brought to any desired angle in respect to the axis of the work by the adjustment of the clamp bolts 20 and the upper section of the table may then be fed to cut a taper hole or any other surface at an angle to the axis of the work.

In connection with my improved construction I preferably employ an adjustable stop of the character shown in Figs. 1 and 10, whereby the extent to which the carriage moves may be readily and accurately controlled. A similar stop may be used for controlling the movement of the slide or of the upper section of the table in respect to the lower section. As shown a bracket 80 is clamped to the lathe bed and presents a pair of hub or bearing portions 81 for supporting a threaded rod 82. Between the two hub parts 81 is a nut 83 threaded on the rod and held against longitudinal movement. This has a scale portion 84 which cooperates with a portion of one of the hubs so that the extent to which the rod 82 is moved endwise may be accurately controlled. In connection with this rod there is employed a plurality of interchangeable extension pieces 85 which may be of various different lengths and each adapted to screw on to the end of the rod 82 and against an adjustable stop 86 on the latter. This extension piece 85 has its end terminating in the path of the carriage, slide, or other moving part, and limits the feeding movement. By adjusting the endwise position of the rod 82, and by the use of a range of extension pieces, the bracket 80 may be permanently clamped in place and the operating end of the stop properly positioned in accordance with the character of the work. If it is desired to bring the different tools on the table to different final positions on the work the proper length of extension piece for each tool may be provided and one substituted for another each time the table is rotated to bring another tool to operative position.

I do not wish to be limited to any particular type of tools, as a wide variety of tools may be mounted and used in my improved apparatus. If the work be secured solely to the work support 17, the tool may be mounted in a single one of the tool holders 35, 36 or 37, or additional support may be given to the tool by mounting it in two of the tool holders, for instance in the way that the tool carrier 58 is mounted in Fig. 6. A tool carrier mounted in the tool holders 36 is illustrated in part in dotted lines in Fig. 1. If it is mounted in only one tool holder a steadying or pilot bar may be centered in the work holder. As shown in Fig. 1 the tool carrier 90 has a pilot bar 91 centered in a bushing 92 of the work carrier.

Having thus described my invention, what I claim as new and desire to secure by Letters Patent is:—

1. A lathe having a rotatable work support, a carriage movable in a direction parallel to the axis of rotation of the work, a slide mounted on the carriage and movable in a direction at right angles to said axis, a table having a plurality of tool holders mounted thereon, and a support carrying said table and mounted on said slide, said table being slidable in a substantially horizontal plane in respect to said slide and independent of the sliding movement of the latter, and said support permitting of the tilting of the plane of sliding movement of said table.

2. A lathe having a rotatable work support, a carriage movable in a direction parallel to the axis of rotation of the work, a slide mounted on the carriage and movable in a direction at right angles to said axis, a table having a plurality of tool holders mounted thereon, and a support mounted on said slide and carrying said table, and permitting of rotary, sliding and tilting movements of said table in respect to said slide.

3. The combination with a lathe carriage slide, of a table having a plurality of tool holders mounted thereon, and connections between said table and said slide permitting of the rotation of the table about a substantially vertical axis, the sliding of the table in a substantially horizontal direction at an angle to the direction of movement of the slide, and the tilting of the plane of movement of the table.

4. In combination, a lathe carriage slide having an annular groove in the upper surface thereof, a table having a plurality of tool holders and having an annular groove in the lower side thereof, and a support mounted on said slide and carrying said table, and having means cooperating with said grooves for holding said support in rotary adjusted position in respect to the slide and holding said table in rotary adjusted position in respect to said support.

5. In combination, a lathe carriage slide, a table having an annular row of spaced tool holders, a support mounted on said slide and carrying said table, said table being rotatable in respect to said support and said support being rotatable in respect to said slide, locking means for connecting said support and said slide, and separate locking means for connecting said support and said table.

6. In combination, a lathe carriage slide, a table having an annular row of spaced tool holders, a support mounted on said slide and carrying said table, said table being rotatable in respect to said support, and said support being rotatable in respect to said slide, locking means for connecting said support and said slide, and separate locking means for connecting said support and said table, one of said locking means including an annular row of recesses spaced in accordance with the spacing of said tool holders.

7. In combination, a lathe slide, a table having a plurality of tool holders, said table having an annular groove in the under surface thereof, and said slide having an annular groove in the upper surface thereof, a support disposed between said slide and said table and having a pair of spaced flanges and bolts carried by said flanges and cooperating with said recesses for connecting the parts.

8. In combination, a lathe carriage slide, a table carried thereby and including a pair of superposed parts, the lower part being rotatable in respect to said slide and the upper part being slidable in respect to the lower part, and provided with a plurality of tool holders.

9. In combination, a lathe carriage slide, a table carried thereby and including a pair of superposed parts, the lower part being rotatable in respect to the slide and the upper part being slidable in respect to the lower part, and provided with a plurality of tool holders, a feed screw for effecting the sliding movement of the upper table part in respect to the lower, and connections between said feed screw and one of said tool holders.

10. In combination, a lathe carriage slide, a table carried thereby and including a pair of superposed parts, the lower part being rotatable in respect to the slide and the upper part being slidable in respect to the lower part, and provided with a plurality of tool holders, a feed screw having threaded engagement with the lower table part and a member carried by one of said tool holders and engaging with said feed screw to effect a movement of the upper table part in the direction of movement of the feed screw and with the latter upon the rotation of said feed screw.

11. A lathe having a rotatable work support, a carriage movable in a direction parallel to the axis of rotation of the work, a slide mounted on the carriage and movable in a direction at right angles to said axis, a table having an annular row of tool holders mounted thereon, connections between said table and said slide and permitting the sliding movement of the table in respect to said slide and the rotation of said table about a substantially vertical axis, and locking means for normally preventing rotation of said table, said locking means including an annular row of apertures spaced in accordance with the spacing of the tool holders on the table.

Signed at New York in the county of New York and State of New York this 9th day of November A. D. 1921.

JOHN M. PALMER.